US007733816B2

(12) United States Patent
Hwang (10) Patent No.: US 7,733,816 B2
(45) Date of Patent: Jun. 8, 2010

(54) PS HANDOVER SUPPORT INDICATION

(76) Inventor: Woonhee Hwang, Juhanintie 6A, 02180 Espoo (FI)

( * ) Notice: Subject to any disclaimer, the term of this patent is extended or adjusted under 35 U.S.C. 154(b) by 323 days.

(21) Appl. No.: 11/592,332

(22) Filed: Nov. 1, 2006

(65) Prior Publication Data

US 2007/0099664 A1    May 3, 2007

Related U.S. Application Data

(60) Provisional application No. 60/732,681, filed on Nov. 1, 2005.

(51) Int. Cl.
*H04B 7/00* (2006.01)
(52) U.S. Cl. ............... 370/310; 455/436; 455/439; 455/445; 455/560; 455/567; 370/335; 370/331; 370/320
(58) Field of Classification Search .......... 455/456, 455/436, 439, 445, 560; 704/207, 230, E15.047, 704/218, 221, 229, 208; 370/331, 335, 320
See application file for complete search history.

(56) References Cited

U.S. PATENT DOCUMENTS

| 2002/0151304 | A1* | 10/2002 | Hogan ................. 455/436 |
| 2002/0160785 | A1 | 10/2002 | Ovesjo et al. |
| 2003/0013443 | A1* | 1/2003 | Willars et al. ........... 455/432 |
| 2004/0120279 | A1* | 6/2004 | Huckins ................. 370/328 |
| 2004/0203836 | A1* | 10/2004 | Gorday et al. ........... 455/454 |
| 2005/0026616 | A1* | 2/2005 | Cavalli et al. ........... 455/436 |
| 2005/0056616 | A1* | 3/2005 | Cooper et al. ............ 216/83 |

FOREIGN PATENT DOCUMENTS

| EP | 1 420 604 | 5/2004 |
| EP | 1 503 606 | 2/2005 |
| WO | WO-2005/027561 | 3/2005 |
| WO | 2005/125256 | 12/2005 |

OTHER PUBLICATIONS

The International Search Report and Written Opinion for PCT/IB2006/003072 mailed on Apr. 13, 2007.
3GPP TSG GERAN2#17-bis, Proposed Draft Input to the TS on "Packet Switched Handover for GERAN A/Gb mode: Stage 2 (Release 6) v0.1.0" on PS handover Signaling Flows; Jan. 12-16, 2004; Source: Nokia; TDoc G2-040082; Agenda Item 5.4.5.2; see p. 11, line 1 to p. 43, line 10, figure 7-22.
ETSI TS 143 129 V6.5.0 (Nov. 2005). Digital cellular telecommunications system (Phase 2+); Packed-switched handover for GERAN A/Gb mode; Stage 2; (3GPP TS 43.129 version 6.5.0 Release 6).
3GPP TS 25.423 v6.7.0 (Sep. 2005) Technical Specification, "3$^{rd}$ Generation partnership Project; Technical Specification Group Radio Access Network; UTRAN Iur interface RNSAP signaling (Release 6)", Section 8 in its entirety and Subsection 9.2.1.30Fa.
Supplementary European Search Report for EP Appl. 06820837.0, mailed Dec. 15, 2009.

\* cited by examiner

*Primary Examiner*—Rafael Pérez-Gutiérrez
*Assistant Examiner*—Joseph Arevalo (57) ABSTRACT

GERAN Cell Capability indicated in a bit of an Information Element is modified to indicate whether a neighbor GERAN cell belonging to a radio access technology (GSM) supports packet switched (PS) handover or not so that the serving radio network controller can be in possession of such information before deciding whether to attempt PS handover to the cell of the GSM network and thereby avoid unnecessary signaling in case such a handover is not possible and to thereby allow the serving radio network controller to consider some other target cell or some other solution than triggering PS handover toward that GSM cell.

19 Claims, 5 Drawing Sheets

9.2.1.30Fa  GERAN Cell Capability

The *GERAN Cell Capability* IE is used to transfer the capabilities of a certain GERAN cell via the Iur interface.

| IE/Group Name | Presence | Range | IE type and reference | Semantics description |
|---|---|---|---|---|
| GERAN Cell Capability | M | | BIT STRING (16) | Each bit indicates whether a cell supports a particular functionality or not. The value 1 of a bit indicates that the corresponding functionality is supported in a cell and value 0 indicates that the corresponding functionality is not supported in a cell. Each bit is defined as follows. The first bit: A/Gb mode. The second bit: Iu mode. Note that undefined bits are considered as a spare bit and spare bits shall be set to 0 by the transmitter and shall be ignored by the receiver. |

FIG. 6 (PRIOR ART)

9.2.1.30Fa  GERAN Cell Capability

The *GERAN Cell Capability* IE is used to transfer the capabilities of a certain GERAN cell via the Iur interface.

| IE/Group Name | Presence | Range | IE type and reference | Semantics description |
|---|---|---|---|---|
| GERAN Cell Capability | M | | BIT STRING (16) | Each bit indicates whether a cell supports a particular functionality or not. The value 1 of a bit indicates that the corresponding functionality is supported in a cell and value 0 indicates that the corresponding functionality is not supported in a cell. Each bit is defined as follows. The first bit: A/Gb mode. The second bit: Iu mode. The third bit: PS Handover Note that undefined bits are considered as a spare bit and spare bits shall be set to 0 by the transmitter and shall be ignored by the receiver. |

DRNS Action during RL Setup/Addition phase

FIG. 8

SRNS Action during RL Setup/Addition phase

PS HANDOVER SUPPORT INDICATION

CROSS-REFERENCE TO RELATED APPLICATION

This application claims priority from U.S. Provisional Application Ser. No. 60/732,681 filed Nov. 1, 2005.

BACKGROUND OF THE INVENTION

1. Technical Field

The present invention relates to mobile communications and, more particularly, to signaling between radio network subsystems relating to handover decisions.

2. Discussion of Related Art

Packet Switched (PS) Handover was defined in Release 6 of the relevant 3GPP documents (23.060, 43.129, 24.008, 44.064, 48.018, 25.331, 25.413) based on a GERAN study. To support inter-Radio Access Technology (inter-RAT) PS Handover between UMTS and GSM, signalling had been added in RRC (Uu interface) and RANAP (Iu interface.) at RAN2 #48 (R2-052315) and RAN3 #48. (R3-050924) (28 Aug. 2005-3 Sep. 2005). But in case of inter-RAT PS Handover from UTRAN to GERAN, the SRNC doesn't know whether the target BSS supports PS Handover or not and the SRNC just has to try. Thus, when the SRNC decides to perform PS Handover toward a GERAN cell, if the SRNC doesn't actually know whether the target BSS supports PS Handover or not, SRNC just has to initiate inter-RAT PS Handover and see whether it will receive a positive reply or not. If the PS Handover attempt fails, the SRNC and SGSN processing is wasted on account of the unnecessary message transfer and unnecessary relocation preparation. This problem can be solved easily if RNC knows the target GERAN cell capability, i.e., whether it support PS Handover or not. This GERAN neighbor cell capability can be configured by O&M system or by some signalling in CRNC, i.e., if the O&M system provides information on GERAN neighbor cell capability to the Controlling RNC (CRNC). However this O&M solution also has a limitation in case the CRNC is not also the SRNC. Because the GERAN cell is a neighbor cell of a cell controlled by CRNC (=DRNC), the O&M system will configure the GERAN Neighbour cell capability only in the DRNC. However, the SRNC is the one which decides whether PS Handover will start or not. In the current 3GPP Specifications, there is no means provided for the SRNC to know whether the target GERAN cell supports PS Handover or not.

DISCLOSURE OF INVENTION

In this invention, it is proposed to provide information such as by using one bit in the GERAN Cell Capacity IE to indicate whether a neighbor GERAN cell supports PS Handover or not in RNSAP (Specified in TS25.423). This GERAN Cell Capacity IE or similar may be included in the Neighbor GSM Cell Information IE and transferred to the SRNC from the DRNC (CRNC) via a RADIO LINK SETUP RESPONSE message, a RADIO LINK SETUP FAILURE message, a RADIO LINK ADDITION RESPONSE message or a RADIO LINK ADDITION FAILURE message.

BRIEF DESCRIPTION OF THE DRAWINGS

FIG. 6 shows a prior art cell capability information element used to transfer the capabilities of a certain cell via the Iur interface, according to the prior art.

FIG. 7 shows the cell capability information element modified, according to the present invention, to include information concerning the ability of a cell to handle a packet switched handover.

BEST MODE FOR CARRYING OUT THE INVENTION

Figure 1:
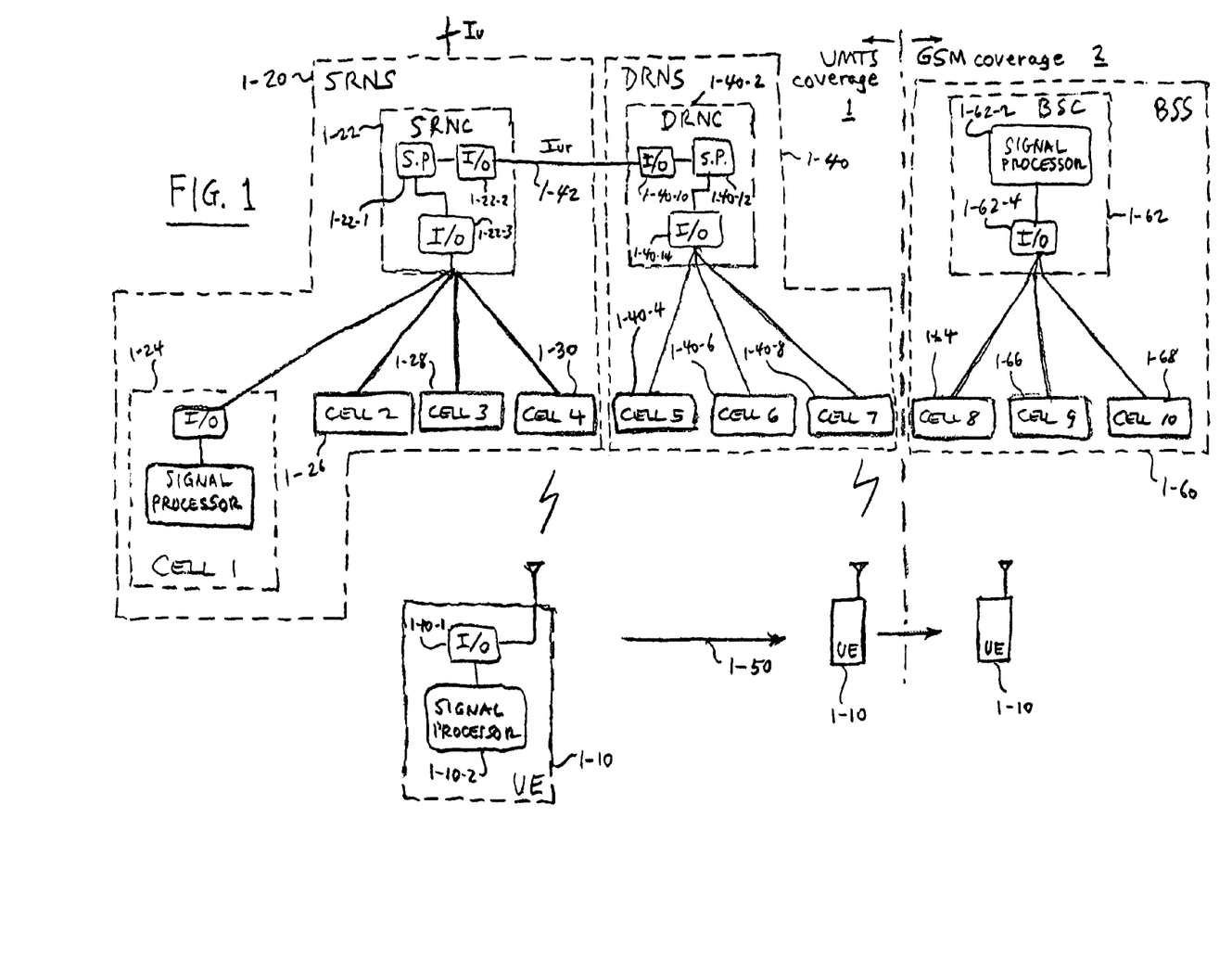
FIG. 1 shows the operation of the present invention in an environment with both UMTS and GSM access with all cells on the UMTS side supporting both circuit switched and packet switched services handover but with only some cells on the GSM side supporting handover in packet switched domain.

FIG. 1 shows the operating environment of the present invention with the possibility of a mobile station or user equipment 1-10 operating in a radio access network according to a first radio access technology 1 and transitioning to a second radio access network according to a second radio access technology 2. In the example shown in FIG. 1, the first radio access technology is according to the Third Generation Partnership Project (3GPP) UMTS (Universal Mobile Telecommunications System) and the second radio access technology (RAT) is according to the GSM (Global System for Mobile Communications) system also know as the second generation system.

In the UMTS coverage area 1 there is shown a serving radio network subsystem (SRNS) 1-20 which includes a serving radio network controller (SRNC) 1-22 and a number of connected cells 1-24, 1-26, 1-28, 1-30, labeled cells 1 through 4, respectively. The SRNC 1-22 is illustrated having a signal processor 1-22-1, an input/output port 1-22-2 and an input/output port 1-22-3 to both of which it is connected. The input/output port 1-22-2 is connected to a drift radio network subsystem (DRNS) 1-40 via an interface 1-42 referred to in the 3GPP specifications as the Iur interface. Only one of the SRNS 1-20 is connected to the core network (not shown), specifically the SRNS via a so-called Iu interface. The exemplary DRNS 1-40 is shown having a DRNC (drift radio network controller) 1-40-2 and a plurality of cells associated therewith having reference numerals 1-40-4, 1-40-6, and 1-40-8, labeled cells 5 through 7 respectively. The DRNC 1-40-2 is shown having an input/output port 1-40-10 connected to the input/output port 1-22-2 of the SRNC 1-22 via the Iur interface 1-42. The DRNC 1-40-2 also includes a signal processor 1-40-12 connected to the input/output port 1-40-10 and to a second input/output port 1-40-14 which in turn is connected to the plurality of cells 1-40-4, 1-40-6, and 1-40-8.

Also shown in the UMTS coverage area 1 of FIG. 1 is a mobile station, also called a user equipment (UE) in the 3GPP specifications and designated by the reference numeral 1-10 in FIG. 1. It is shown in radio communication with the SRNS 1-20 and specifically having a radio link with the fourth cell (cell 4) with reference numeral 1-30. It may come to pass that the UE 1-10 of FIG. 1 in moving about in the UMTS coverage area 1 may move along a path 1-50 toward the coverage area of cells 1-40-4, 1-40-6, 1-40-8 connected to the DRNC 1-40-2 of DRNS 1-40. Similarly, the mobile station may at some future point start to move into the GSM coverage area 2 and there may be a need to utilize a base station subsystem 1-60 according to the GSM radio access technology (RAT). This is a scenario that is contemplated by current developments in the applicable specifications. Within the BSS 1-60 is shown a BSC (Base Station Controller) 1-62 having a signal processor 1-62-2 connected to an input/output port 1-62-4 which is in turn connected to a plurality of cells 1-64, 1-66, and 1-68. The mobile station/UE 1-10 moving into the GSM coverage area 2 may be able to be served by one of the cells 1-64, 1-66, or 1-68 and certain signaling has to be done in preparation for such a transition. As explained in the Background of the Invention section above, the problem in the prior art is that the packet switched service handover from the UMTS coverage area 1 to the GSM coverage area 2 is problematic in that the SRNS 1-20/SRNC 1-22 do not know in advance whether the target BSS 1-60 supports packet switched handover or not and the SRNC 1-22 just has to make the attempt with all of the accompanying signaling required. In accordance with the present invention, as the user equipment 1-10 moves along the path 1-50 of FIG. 1 and the SRNS 1-20 decides to set up or add a radio link or links associated with another radio network subsystem such as DRNS 1-40, it will acquire information about cells not only associated with the DRNS 1-40 but also with its neighboring cells 1-64, 1-66, and 1-68 of the BSS 1-60 within the second radio access technology (RAT) coverage area 2, in this embodiment GSM. More specifically, the SRNS 1-20 acquires information concerning whether cell 1-64 (cell 8) which adjoins cell 1-40-8 (cell 7) can support PS handover. Subsequently, when SRNC 1-21 comes to determine that a handover is perhaps needed to the second RAT coverage area 2, it can refer to the information previously obtained about whether the cell 1-64 can handle PS handover or not and internally decide whether to make a handover to that particular cell 1-64 or not, depending on whether PS services are necessary or not. If the GSM cell 1-64 does not support PS services then the SRNC 1-22 may decide not to make a handover to the GSM cell 1-64. The capability information acquisition phase, according to the present invention, is carried out by means of signaling shown in FIGS. 2 through 5 with signals also used in the prior art but modified according to the present invention to transfer the needed information to the SRNC prior to making a handover to the second radio access technology coverage area. In the example shown in FIGS. 2-5, the response/failure signals sent by the DRNC in response to a setup/addition request message is the signal that is used to convey the information from the DRNC to the SRNC according to the present invention.

Figure 2:
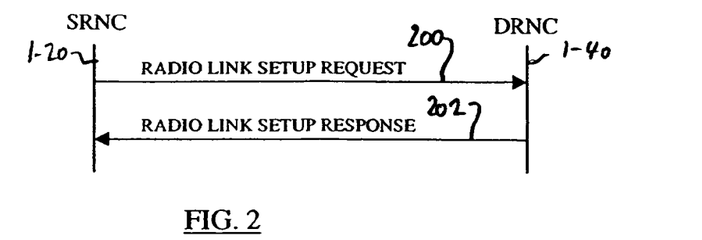
FIG. 2 shows a possible signaling procedure for a successful radio link setup using an information element modified according to the present invention.

With regard to FIGS. 2-5, reference is made to the 3GPP technical specification TS 25.423 V6.7.0 (2005-09) entitled "Group Radio Access Network; UTRAN Iur Interface RNSAP Signaling (Release 6)" for a description of the radio link setup request and the radio link addition request procedures. In particular, with reference to FIG. 2, a radio link setup procedure is described in Section 8.3 entitled "Dedicated Procedures" under subsection 8.3.1 wherein the radio link setup procedure is described in detail. In that specification subsection, it is set forth that the procedure described is used for establishing the necessary resources in the DRNS for one or more radio links. The DRNC shown in FIG. 2 is a "drift radio network controller" which is part of a radio network subsystem such as the RNS of FIG. 1 which may also be called the drift RNS. As such, the role an RNS can take with respect to a specific connection between UE/mobile station and the radio access network is that it supports the serving RNS/SRNC with radio resources when the connection between the radio access network and the user equipment/mobile station need to use cell(s) controlled by this RNS. The so called serving RNC (SRNC) is part of a radio network subsystem as well and it may be referred to as a serving RNS. An RNS can take the role of a serving RNS with respect to a specific connection between a user equipment and a radio access network. There is one serving RNS for each UE that has a connection to the radio access network. The serving RNS is in charge of the RRC connection between a user equipment/mobile station and the radio access network. The serving RNS terminates the Iu for this connection.

Figure 3:
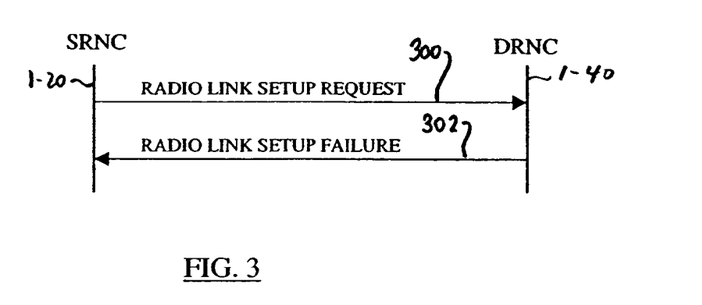
FIG. 3 shows a radio link setup procedure for an unsuccessful operation with the signaling information modified according to the present invention.

The successful operation shown in FIG. 2 is similar to that described in the above-mentioned 3GPP TS 25.423 V6.7.0 (2005-09) specification in subsection 8.3.1.2 except with the response message modified according to the present invention. According to the specification, when the SRNC 1-20 makes an algorithmic decision 8-20 to add the first cell or set of cells from a DRNS to the active set of a specific UE-UTRAN connection, a RADIO LINK SETUP REQUEST message 200 is sent to the corresponding DRNC 1-40 to request establishment of the radio link(s). Thus the Radio Link Setup procedure is initiated with this RADIO LINK SETUP REQUEST message 200 sent from the SRNC 1-20 to the DRNC 1-40. Upon receiving the RADIO LINK SETUP REQUEST message, the DRNC 1-40 reserves the necessary resources and configures the new radio link(s) according to the parameters given in the message. It sends a RADIO LINK SETUP RESPONSE message 202 modified, according to the present invention to include information about the ability of one or more neighboring cells of the second RAT coverage area 2 to handle packet switched (PS) services. The unsuccessful operation procedure is described in subsection 8.3.1.3 of TS 25.423 and is similar to the successful operation procedure. It is illustrated in FIG. 3, with the failure message modified according to the present invention. It includes the same radio link setup request signal 300 of the procedure shown in FIG. 2 but the response is the RADIO LINK SETUP FAILURE message 302 instead of a RADIO LINK SETUP RESPONSE message. The RADIO LINK SETUP FAILURE message 302 includes a general CAUSE IE or a Cause IE for each failed radio link indicating the reason for failure. If some radio links were established successfully, the DRNC 1-40 indicates this in the RADIO LINK SETUP FAILURE message 302 in the same way as in the RADIO LINK SETUP RESPONSE message.

Figure 4:
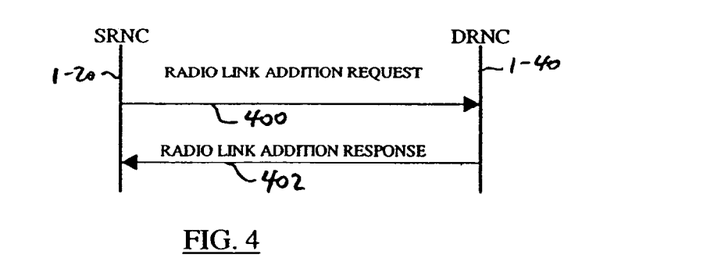
FIG. 4 shows a radio link addition procedure with an information element provided according to the present invention for a successful operation.

The radio link addition procedure of FIG. 4 is described in the above-mentioned 3GPP TS 25.423 specification at section 8.3.2 but is modified according to the present invention in a manner similar to that already described in connection with FIGS. 2 and 3. It is a procedure used for establishing the necessary resources in the DRNS for one or more additional radio links towards a user equipment when there is already at least one radio link established to the concerned user equipment via this DRNS. The successful operation shown in FIG.

Figure 5:
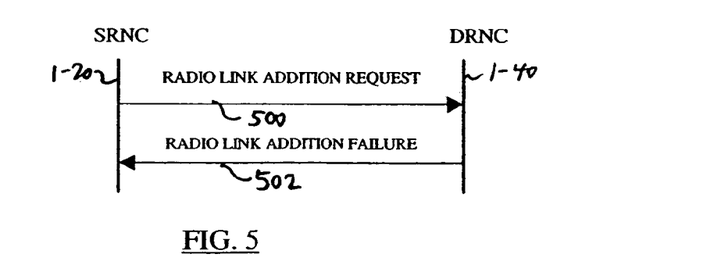
FIG. 5 shows a radio link addition procedure for an unsuccessful operation with information provided according to the present invention.

4 is described in subsection 8.3.2.2 wherein in response to the illustrated RADIO LINK ADDITION REQUEST message 400 sent from the SRNC to the DRNC, the DRNS reserves the necessary resources and configures the new radio link(s) according to the parameters given in the message. A RADIO LINK ADDITION RESPONSE message 402 may be modified, according to the present invention, to include information about the neighboring GSM cell's ability to handle PS services. An unsuccessful operation is illustrated in FIG. 5 and is described in detail in subsection 8.3.2.3 of 3GPPS TS 25.423. In that specification, it is stated that if the establishment of at least one radio link is unsuccessful the DRNC responds to the RADIO LINK ADDITION REQUEST message 500 with a RADIO LINK ADDITION FAILURE message 502 which includes a general Cause IE or a CAUSE IE for each failed radio link. The Cause IE indicates the reason for failure. As in the failure case described in connection with FIG. 3, if one or more radio links were established successfully the DRNC indicates this in the RADIO LINK ADDITION FAILURE message 502 in the same way as in the RADIO LINK ADDITION RESPONSE message 402.

Referring now to FIG. 6, an information element is shown according to the prior art indicating GERAN cell capability. This is taken from the 3GPP TS 25.423 V6.7.0 (2005-09) specification entitled "Group Radio Access Network; UTRAN Iur Interface RNSAP signaling (Release 6)" at section 9.2.1.30Fa. The GERAN Cell Capability IE is used to transfer the capabilities of certain GERAN cell via the Iur interface.

As pointed out above, when the SRNC decides to perform PS handover toward a GERAN cell, if the SRNC doesn't know whether the target BSS supports PS handover or not, the SRNC just has to initiate inter RAT PS handover and see whether it will receive a positive reply or not. If the PS handover attempt fails, the SRNC and SGSN processing is wasted due to unnecessary message transfer and unnecessary relocation preparation. This problem can be solved according to the present invention by adding information to a message sent over the Iur interface 1-42 prior to the attempt to handover. Such can be done as shown in FIG. 7 for example by adding information in the GERAN Cell Capability information element. As shown in FIG. 7, the 16 bit string of the GERAN Cell Capability IE has a first bit and a second bit already defined for indicating the A/Gb mode and the Iu mode, respectively. According to the present invention, one of the undefined bits such as the third bit can be defined as indicating the ability of the GERAN cell 1-60 to support a PS handover or not. For instance, if the bit indicates a "1" it would indicate that the corresponding PS handover functionality is supported in a cell while the "0" bit indication indicates that the corresponding functionality of PS handover is not supported in the cell. The undefined bits can be set to zero and can be ignored by the receiver.

Figure 8:
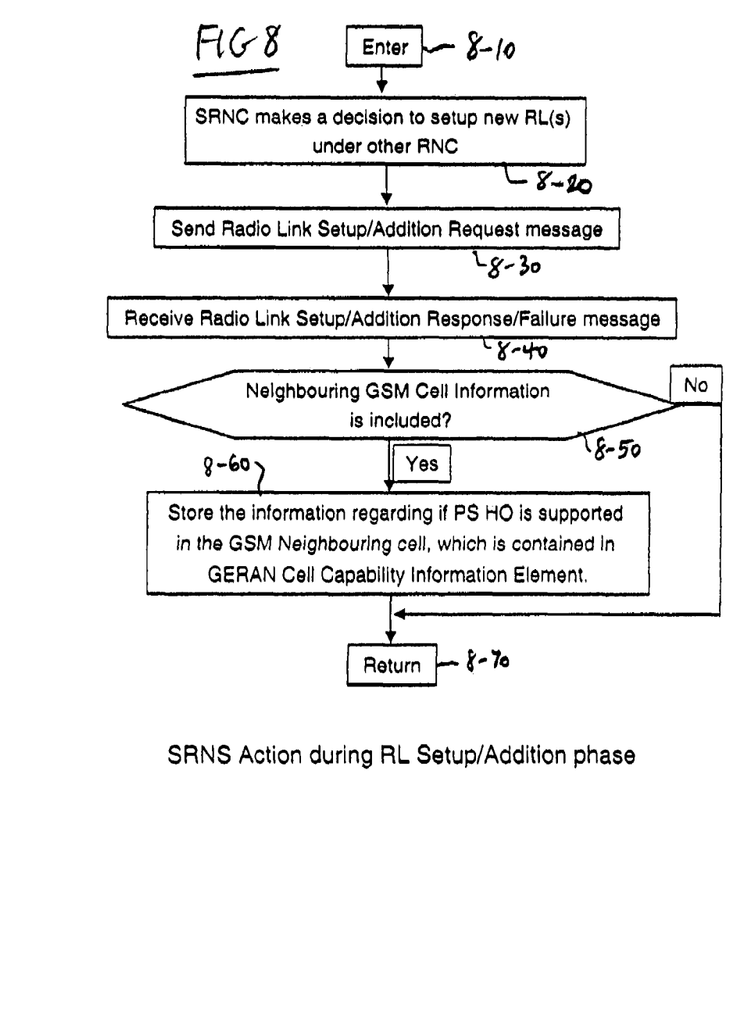
FIG. 8 shows a simplified flow chart illustrating steps carried out by the signal processor of the serving SRNC of FIG. 1, according to the present invention.

It will be observed from FIG. 1 that each of the major functional blocks 1-10, 1-20, 1-24, 1-40-2, and 1-62 includes a signal processor and at least one input/output (I/O) port. Exemplary steps which may be carried out by the signal processors of the SRNC functional block 1-22 will be described below in connection with FIGS. 8 and 10. Likewise, operation of the DRNC functional block 1-40-2 will be described in some detail in connection with FIG. 9. Referring now to FIG. 8, a simplified flow chart is shown describing the steps carried out in a signal processor 1-20-2 of the SRNS 1-20 of FIG. 1. After entry in a step 8-10, the SRNC processor 1-22-1 makes a decision in a step 8-20 to setup/add a new radio link or links under another RNC such as the DRNC 1-40-2 of DRNS 1-40 to the active set of a specific UE/MS-UTRAN connection as shown in the step 8-20. After that, the signal processor 1-22-1 executes a step 8-30 shown in FIG. 8 and sends the RADIO LINK SETUP REQUEST message on the line 200 of FIG. 2 over the Iur interface 1-42 shown in FIG. 1. The DRNC 1-40-2 then carries out the steps to be described later in connection with FIG. 9, culminating in the sending of the RADIO LINK SETUP RESPONSE message on the line 202 of FIG. 2. As shown in FIG. 8 step 8-40, the SRNC 1-22 receives the message on the line 202 for processing by the signal processor 1-22-1. The processor 1-22-1 may then execute a decision step 8-50 to determine whether or not the RL SETUP/ADDITION RESPONSE message includes neighboring GSM cell information or not. If not, a return is made in a step 8-70. If so, a step 8-60 is executed to store the information contained in the GERAN Cell Capability IE regarding if PS handover is possible to the neighboring GERAN cell from added cell(s) from the received RADIO LINK SETUP/ADDITION RESPONSE/FAILURE message for future use in making handover decisions. A return may then be made in the step 8-70 as shown in FIG. 8.

Figure 9:
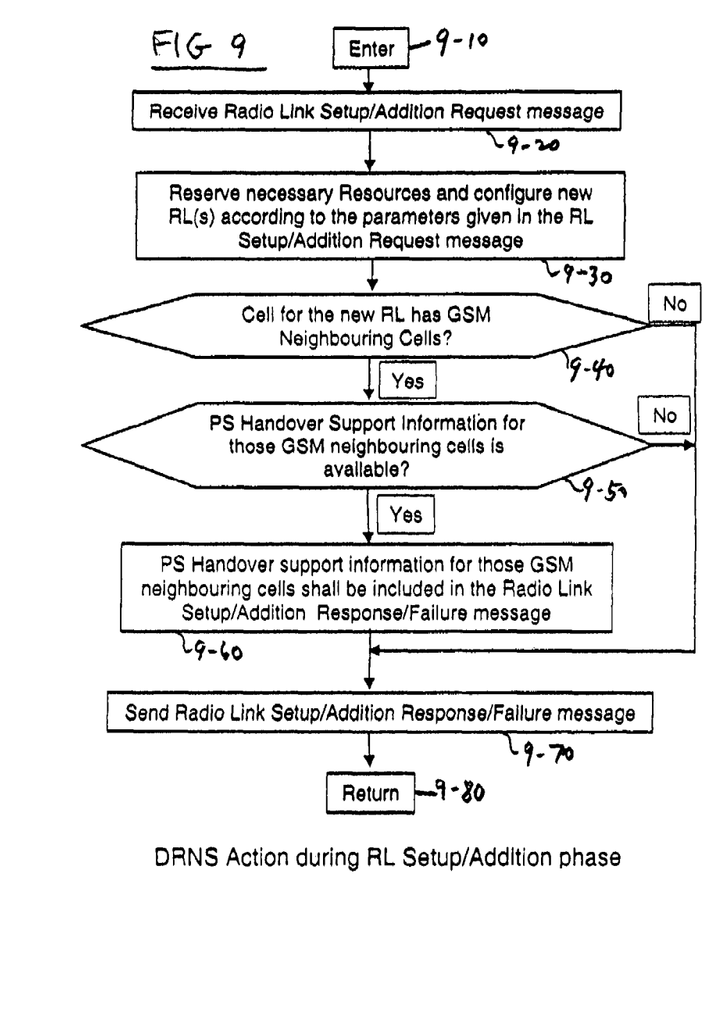
FIG. 9 shows a simplified flow chart illustrating steps carried out by the signal processor of the controlling (drift) DRNC of FIG. 1, according to the present invention.

Referring now to FIG. 9, a series of steps are illustrated which may be carried out by a signal processor 1-40-12 of FIG. 1 within the DRNC 1-40-2. After entering in a step 9-10, a step 9-20 is carried out to receive the RADIO LINK SETUP REQUEST message 200 or the RADIO LINK ADDITION REQUEST message 400 from the SRNS 1-20 over the Iur interface 1-42. A step 9-30 is then executed to reserve necessary resources and configure a new radio link or links according to parameters given in the radio link setup/addition request message. After carrying out step 9-30, a decision step 9-40 is carried out to determine if any of the new cell(s) for the new RL(s) has any neighboring cells that are in the GSM coverage area 2. If so, a determination is made in a step 9-50 if the neighbouring cell(s) that are in the GSM coverage area 2 support packet switched services handover. If so, a step 9-60 is executed to include in the RL SETUP/ADDITION RESPONSE/FAILURE message the information that is needed by the SRNC 1-22 that packet switched handover is possible in the neighboring GSM cell(s). A step 9-70 is then executed to send the RL SETUP/ADDITION RESPONSE/FAILURE message with the information about whether the neighboring GSM cell can handle a PS Handover or not. If step 9-40 or step 9-50 results in a negative decision, the step 9-70 is executed directly, without including any such information.

Once the information concerning the Cell Capability in the second-RAT coverage area 2 is stored in the SRNC 1-22 of the SRNS 1-20 of FIG. 1, there will be no need for the SRNC 1-22 to even attempt to make a packet switched handover to a BSS with regard to which it is already known in the SRNS 1-20 that this BSS does not have the capability to handle packet switched services. Thus, an inter-RAT Handover such as but not limited to that described in Section 5.3 of Technical Specification 3GPP TS 43.129 V6.4.0 (2005-09) entitled "Group GERAN; Packet-Switched Handover for GERAN A/Gb Mode; Stage 2 (Release 6)" will not be performed toward a BSS which doesn't support PS Handover and need not be attempted and therefore the signaling required between the SRNC and the SGSN as well as the signaling between the SGSN and the BSS for relocation preparation need not be carried out and the invention reduces wasteful signaling that would otherwise be required according to the prior art.

Figure 10:
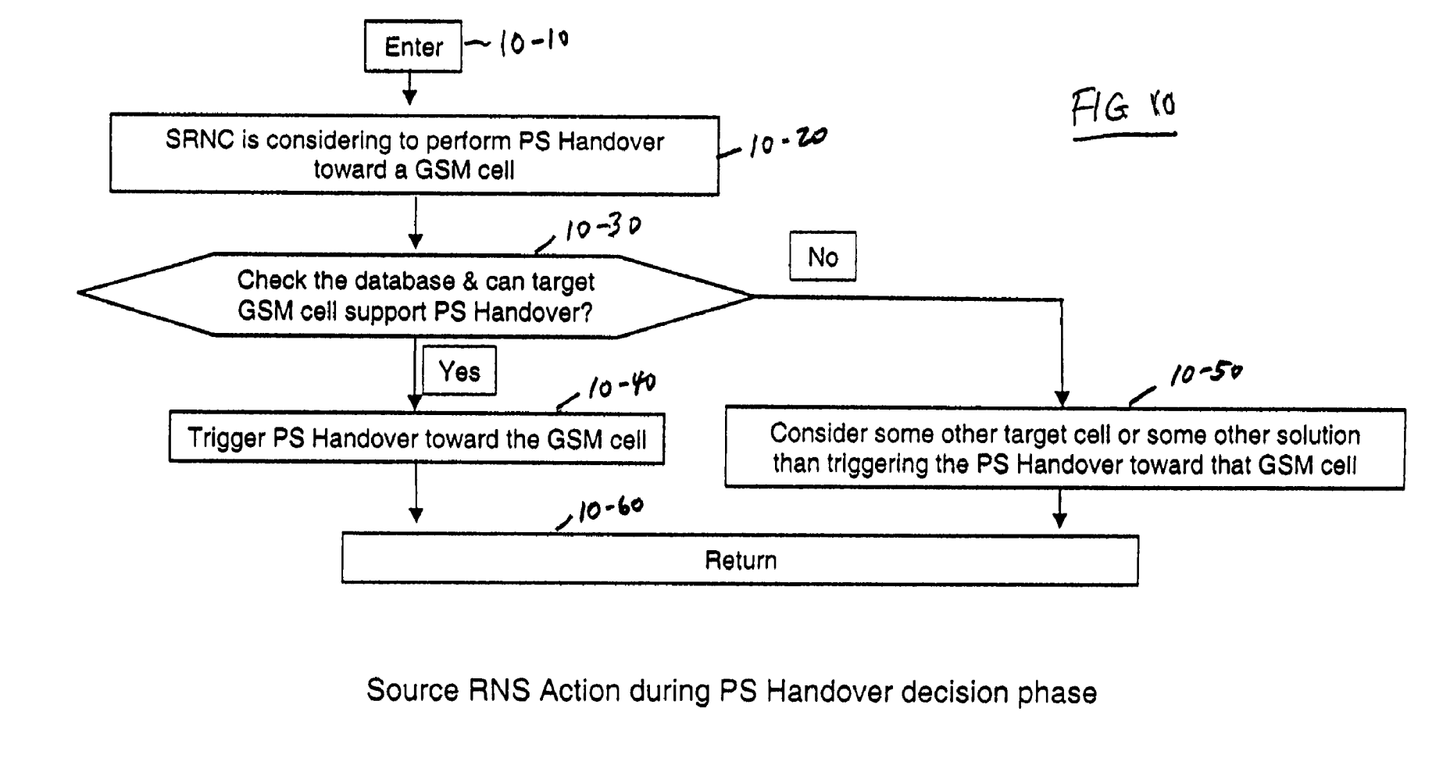
FIG. 10 shows a simplified flow chart illustrating further steps carried out by the signal processor of the SRNC of FIG. 1 after carrying out the steps of FIG. 8, according to the present invention.

FIG. 10 shows a simplified flow chart illustrating the steps which may be carried out according to the present invention in the SRNC 1-22 of FIG. 1 after execution of the steps of FIG. 8 therein. It will be recalled that after execution of the steps of FIG. 8 the SRNC 1-22 will have the information concerning the ability of the cell of the BSC 1-62 of the BSS 1-60 to handle packet switched services or not. After entering in a step 10-10, a step 10-20 is executed in which the SRNC signal processor 1-22-1 considers whether to perform a PS handover towards a GSM cell such as the cell 1-64 of FIG. 1 neighboring the cell 1-40-8 of the UMTS coverage area 1. The signal processor 1-22-1 checks its database to determine if the target GSM cell supports PS handover or not. If not, some other target cell is considered in a step 10-50 or some other solution than triggering the PS handover toward that GSM cell is considered. A return is then made in a step 10-60. On the other hand, if the step 10-30 determines that the GSM cell 1-64 supports PS handover, a step 10-40 is executed to trigger PS handover toward that GSM cell. A return is then made in the step 10-60.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. A method performed by a first radio network controller comprising:
   sending a radio link setup request message or a radio link addition request message from a first radio network controller controlling a cell currently serving a user equipment to a second radio network controller, wherein the radio link setup request message or the radio link addition request message is configured to cause a setup of a new radio link between the user equipment and a target cell connected to the second radio network controller, and wherein the target cell has a neighbor cell confirming to a different radio access technology than the first and second radio network controllers;
   receiving at the first radio network controller a response message from the second radio network controller, wherein the response message is one of a radio link setup response message, a radio link addition response message, a radio set up failure message, or a radio link addition failure message, wherein the response message includes information identifying a handover capability of the neighbor cell, and wherein the information identifying the handover capability of the neighbor cell indicates if the neighbor cell supports packet-switched handovers;
   storing the information identifying the handover capability of the neighbor cell at the first radio network controller;
   triggering a packet switched handover to the neighbor cell if the neighbor cell supports packet-switched handovers; and
   considering an alternative cell if the neighbor cell does not supports packet-switched handovers.

2. The method of claim 1, further comprising deciding to setup the new radio link between the user equipment and the target cell.

3. The method of claim 1, further comprising determining if the information identifying the handover capability of the neighbor cell is included in the response message.

4. The method of claim 1, wherein the first and second radio network controllers conform to Universal Mobile Telecommunications System (UMTS), and wherein the neighbor cell conforms to Global System for Mobile communications (GSM).

5. A method performed by a second radio network controller comprising:
   receiving, at a second radio network controller, a radio link setup request message or a radio link addition request message from a first radio network controller controlling a cell currently serving a user equipment, wherein the radio link setup request message or the radio link addition request message is configured to cause a setup of a new radio link between the user equipment and a target cell connected to the second radio network controller, and wherein the target cell has a neighbor cell conforming to a different radio access technology than the first and second radio network controllers;
   determining a handover capability of the neighbor cell; and
   sending to the first radio network controller a response message from the second radio network controller, wherein the response message is one of a radio link setup response message, a radio link addition response message, a radio link setup failure message, or a radio link addition failure message, wherein the response message includes information identifying the handover capability of the neighbor cell, and wherein the information identifying the handover capability of the neighbor cell indicates if the neighbor cell supports packet-switched handovers.

6. The method of claim 5, further comprising reserving resources and configuring the new radio link according to the radio link setup request message or the radio link addition request message.

7. The method of claim 5, wherein the response message includes a packet switched handover indication bit of a bit string, wherein the bit string comprises a GERAN cell capability information element used to transfer information between the first and second radio network controllers via an Iur interface.

8. A method comprising:
   sending a radio link setup request message or a radio link addition request message from a first radio network controller to a second radio network controller, wherein the radio link setup request message or the radio link addition request message is configured to cause a setup of a new radio link between the user equipment and a target cell connected to the second radio network controller, and wherein the target cell has a neighbor cell conforming to a different radio access technology than the first and second radio network controllers;
   receiving the radio link setup request message or the radio link addition request message at the second radio network controller;
   determining, at the second radio network, a handover capability of the neighbor cell; and
   sending to the first radio network controller a response message from the second radio network controller, wherein the response message is one of a radio link setup response message, a radio link addition response message, a radio link setup failure message, or a radio link addition failure message, wherein the response message includes information identifying the handover capability of the neighbor cell, and wherein the information identifying the handover capability of the neighbor cell indicates if the neighbor cell supports packet-switched handovers;
   triggering a packet switched handover to the neighbor cell if the neighbor cell supports packet-switched handovers; and
   considering an alternative cell if the neighbor cell does not supports packet-switched handovers.

9. A radio network controller comprising:
a first port configured to send a radio link setup request message or a radio link addition request message from the radio network controller to a second radio network controller, wherein the radio network controller controls a cell currently serving a user equipment, wherein the radio link setup request message or the radio link addition request message is configured to cause a setup of a new radio link between the user equipment and a target cell connected to the second radio network controller, and wherein the target cell has a neighbor cell conforming to a different radio access technology than the radio network controller and the second radio network controller;
a second port configured to receive a response message from the second radio network controller, wherein the response message is one of a radio link setup response message, a radio link addition response message, a radio link setup failure message, or a radio link addition failure message, wherein the response message includes information identifying a handover capability of the neighbor cell, and wherein the information identifying the handover capability of the neighbor cell indicates if the neighbor cell supports packet-switched handovers; and
a storage element configured to store the handover capability of the neighbor cell; and
a processor configured to trigger a packet switched handover to the neighbor cell if the neighbor cell supports packet-switched handovers; and
considering an alternative cell if the neighbor cell does not supports packet-switched handovers.

10. The radio network controller of claim 9, further comprising a processor to decide to setup the new radio link between the user equipment and the target cell.

11. The radio network controller of claim 9, wherein the radio network controller and the second radio network controller conform to Universal Mobile Telecommunications System (UMTS), and wherein the neighbor cell conforms to Global System for Mobile communications (GSM).

12. The radio network controller of claim 10, wherein the processor is further configured to determine if the information identifying the handover capability of the neighbor cell is included in the response message.

13. A radio network controller comprising:
a first port configured to receive a radio link setup request message or a radio link addition request message from a second radio network controller controlling a cell currently serving a user equipment, wherein the radio link setup request message or the radio link addition request message is configured to cause a setup of a new radio link between the user equipment and a target cell connected to the radio network controller, and wherein the target cell has a neighbor cell conforming to a different radio access technology than the radio network controller and the second radio network controller;
a processor configured to determine a handover capability of the neighbor cell; and
a second port configured to send to the second radio network controller a response message, wherein the response message is one of a radio link setup response message, a radio link addition response message, a radio link setup failure message, or a radio link addition failure message, wherein the response message includes information identifying the handover capability of the neighbor cell, and wherein the information identifying the handover capability of the neighbor cell indicates if the neighbor cell supports packet-switched handovers.

14. The radio network controller of claim 13, wherein the response message includes a packet switched handover indication bit of a bit string, wherein the bit string comprises a GERAN cell capability information element used to transfer information via an Iur interface between the first and second radio network controllers.

15. The radio network controller of claim 13, wherein the processor is further configured to reserve resources and configure the new radio link according to the radio link setup request message or the radio link addition request message.

16. A system comprising:
a first radio network controller including
a first port configured to send a radio link setup request message or a radio link addition request message from the first radio network controller controlling a cell currently serving a user equipment to a second radio network controller, wherein the radio link setup request message or the radio link addition request message is configured to cause a setup of a new radio link between the user equipment and a target cell connected to the second radio network controller, and wherein the target cell has a neighbor cell conforming to a different radio access technology than the first and second radio network controllers;
a second port configured to receive a response message from the second radio network controller, wherein the response message is one of a radio link setup response message, a radio link addition response message, a radio link setup failure message, or a radio link addition failure message, wherein the response message includes information identifying a handover capability of the neighbor cell, and wherein the information identifying the handover capability of the neighbor cell indicates if the neighbor cell supports packet-switched handovers; and
a storage element configured to store the handover capability of the neighbor cell;
a processor configures to trigger a packet switched handover to the neighbor cell if the neighbor cell supports packet-switched handovers; and
considering an alternative cell if the neighbor cell does not supports packet-switched handovers; and
the second radio network controller comprising:
a first port configured to receive the radio link setup request message or the radio link addition request message from the first radio network controller;
a processor configured to determine the handover capability of the neighbor cell; and
a second port configured to send to the first radio network controller the response message.

17. A computer-readable medium having computer-readable instructions stored thereon that, when executed by a processor, cause a computing device to:
send a radio link setup request message or a radio link addition request message from a first radio network controller controlling a cell currently serving a user equipment to a second radio network controller, wherein the radio link setup request message or the radio link addition request message is configured to cause a setup of a new radio link between the user equipment and a target cell connected to the second radio network controller, and wherein the target cell has a neighbor cell conforming to a different radio access technology than the first and second radio network controllers;

receive at the first radio network controller a response message from the second radio network controller, wherein the response message is one of a radio link setup response message, a radio link addition response message, a radio link setup failure message, or a radio link addition failure message, wherein the response message includes information identifying a handover capability of the neighbor cell, and wherein the information identifying the handover capability of the neighbor cell indicates if the neighbor cell supports packet-switched handovers;

store the information identifying the handover capability of the neighbor cell at the first radio network controller, trigger a packet switched handover to the neighbor cell if the neighbor cell supports packet-switched handovers; and considering an alternative cell if the neighbor cell does not supports packet-switched handovers.

18. A computer-readable medium having computer-readable instructions stored thereon that, when executed by a processor, cause a computing device to:

receive a radio link setup request message or a radio link addition request message from a first radio network controller controlling a cell currently serving a user equipment, wherein the radio link setup request message or the radio link addition request message is configured to cause a setup of a new radio link between the user equipment and a target cell connected to a second radio network controller, and wherein the target cell has a neighbor cell conforming to a different radio access technology than the first and second radio network controllers;

determine a handover capability of the neighbor cell; and send to the first radio network controller a response message from the second radio network controller, wherein the response message is one of a radio link setup response message, a radio link addition response message, a radio link setup failure message, or a radio link addition failure message, wherein the response message includes information identifying the handover capability of the neighbor cell, and wherein the information identifying the handover capability of the neighbor cell indicates if the neighbor cell supports packet-switched handovers.

19. A method for generating a message at a drift radio network controller, the method comprising:

receiving, at a drift radio network controller, a radio link setup request message or a radio link addition request message from a serving radio network controller controlling a cell currently serving a user equipment, wherein the radio link setup request message or the radio link addition request message is configured to cause a setup of a new radio link between the user equipment and a target cell connected to the drift radio network controller, and wherein the target cell has a neighbor GERAN cell conforming to a different radio access technology than the serving and drift radio network controllers;

determining a handover capability of the neighbor GERAN cell at the drift radio network controller;

generating a response message at the drift radio network controller, wherein the response message includes a data structure comprising a GERAN cell capability information element, wherein the GERAN cell capability information element includes a bit indicating the handover capability of the neighbor GERAN cell, and wherein the GERAN cell capability information element indicates if the neighbor GERAN cell supports packet-switched handovers; and transmitting the response message over an Iur interface between the drift radio network controller and the serving radio network controller, wherein the response message is one of a radio link setup response message, a radio link addition response message, a radio link setup failure message, or a radio link addition failure message.

* * * * *